US008671342B2

(12) United States Patent
DeLuca et al.

(10) Patent No.: US 8,671,342 B2
(45) Date of Patent: Mar. 11, 2014

(54) DESIRED FONT RENDERING

(75) Inventors: Lisa Seacat DeLuca, San Francisco, CA (US); Brian Daniel Goodman, Brooklyn, NY (US); Angel E. Tomala-Reyes, Flushing, NY (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 12/883,609

(22) Filed: Sep. 16, 2010

(65) Prior Publication Data

US 2012/0072978 A1    Mar. 22, 2012

(51) Int. Cl.
*G06F 17/00* (2006.01)
*G06F 15/16* (2006.01)
*G06F 7/04* (2006.01)

(52) U.S. Cl.
USPC ........... 715/269; 715/234; 715/255; 709/206; 709/217; 726/7

(58) Field of Classification Search
USPC ......... 715/200, 201, 205, 209, 255, 256, 269, 715/273, 700, 760, 860; 709/201, 202, 203, 709/206, 217, 219, 220, 223; 726/2, 4, 7, 726/21, 27, 28
See application file for complete search history.

(56) References Cited

U.S. PATENT DOCUMENTS

| 5,990,907 | A | 11/1999 | Colletti | |
| 6,853,980 | B1* | 2/2005 | Ying et al. | 705/26.62 |
| 7,640,498 | B2 | 12/2009 | Koechley et al. | |
| 7,970,841 | B2* | 6/2011 | Wang et al. | 709/206 |
| 8,311,527 | B2* | 11/2012 | Jeung et al. | 455/414.4 |
| 2002/0010725 | A1 | 1/2002 | Mo | |
| 2002/0136578 | A1* | 9/2002 | Johnson et al. | 400/70 |
| 2004/0109020 | A1* | 6/2004 | Song | 345/744 |

(Continued)

FOREIGN PATENT DOCUMENTS

| GB | 2316778 A | 3/1998 |
| WO | WO 2006101287 A | 9/2006 |
| WO | WO2007/052264 A2 * | 5/2007 |

OTHER PUBLICATIONS

Adobe forum [retrieved on Aug. 30, 2010]. Retrieved from the Internet: <URL: http://forums.adobe.com/message/2903409>.

(Continued)

*Primary Examiner* — Maikhanh Nguyen
(74) *Attorney, Agent, or Firm* — Cahn & Samuels, LLP (57) ABSTRACT

An embodiment of the invention provides a method for displaying a message from a first user to a second user, wherein the message from the first user is received in a system of the second user. The message includes text in an intended font and metadata, wherein the metadata includes a link to a font source. It is determined whether the intended font is on the system of the second user; and, if the intended font is not on the system of the second user, rendering instructions are obtained from the font source. The rendering instructions include instructions on how to display the text in the intended font on the system of the second user without downloading the intended font to the system of the second user. The text is displayed in the intended font on the system of the second user using the rendering instructions.

10 Claims, 6 Drawing Sheets

(56) References Cited

U.S. PATENT DOCUMENTS

| | | | |
|---|---|---|---|
| 2004/0177056 A1 | 9/2004 | Davis et al. | |
| 2005/0033814 A1* | 2/2005 | Ota | 709/206 |
| 2005/0080839 A1 | 4/2005 | Kuwata et al. | |
| 2005/0094172 A1* | 5/2005 | Engelman et al. | 358/1.11 |
| 2005/0094173 A1* | 5/2005 | Engelman et al. | 358/1.11 |
| 2005/0207390 A1* | 9/2005 | Soheili et al. | 370/349 |
| 2006/0020615 A1* | 1/2006 | Keohane et al. | 707/101 |
| 2006/0253395 A1* | 11/2006 | Corbell | 705/50 |
| 2007/0242072 A1 | 10/2007 | Fattic, II et al. | |
| 2008/0028304 A1 | 1/2008 | Levantosky et al. | |
| 2008/0280633 A1* | 11/2008 | Agiv | 455/466 |
| 2008/0306916 A1 | 12/2008 | Gonzalez et al. | |
| 2009/0100074 A1 | 4/2009 | Joung et al. | |
| 2009/0275351 A1* | 11/2009 | Jeung et al. | 455/466 |
| 2009/0300125 A1* | 12/2009 | Wang et al. | 709/206 |
| 2010/0104104 A1 | 4/2010 | Huo | |
| 2011/0126191 A1* | 5/2011 | Hughes et al. | 717/178 |
| 2011/0203000 A1* | 8/2011 | Bacus et al. | 726/26 |

OTHER PUBLICATIONS

Arseneau, Donald, "URL. STY Version 3.3," Apr. 12, 2006.

cnet review [retrieved on Aug. 30, 2010]. Retrieved from the Internet: <URL: http://reviews.cnet.com/8301-13727_7-10330173-263. html>.

Fulton, Jim., "The X Font Service Protocol," Version 2.0, X Consortium Standard, X Version 1, Release 6.4, Revised May 2, 1994.

Portable Document Format, online encyclopedia article [retrieved on Sep. 16, 2010]. Retrieved from the Internet: <URL: http://en.wikipedia.org/wiki/Portable_Document_Format>.

PostScript, online encyclopedia article [retrieved on Aug. 30, 2010]. Retrieved from the Internet: <URL: http://en.wikipedia.org/wiki/PostScript>.

Typeface, online encyclopedia article [retrieved on Aug. 30, 2010]. Retrieved from the Internet: <URL: http://en.wikipedia.org/wiki/Typeface>.

Typekit [retrieved on Jun. 18, 2010]. Retrieved from the Internet: <URL: typekit.com> and <URL: typekit.com/tour/control>.

* cited by examiner

DESIRED FONT RENDERING

BACKGROUND

The present invention is in the field of methods, systems, and computer program products to ensure desired font rendering. Fonts are used to print or display character data using a combination of metrics (size and positioning data) and raster patterns (shape and density of blackness). A style sheet (also called a "template") is a file or form that defines the layout of a web page. Style sheets include parameters for displaying the web page, such as font, page size, and margins.

SUMMARY OF THE INVENTION

An embodiment of the invention includes methods, systems, and computer program products to ensure desired font rendering. More specifically, a method for displaying a message from a first user to a second user receives the message from the first user in a system of the second user. The message includes text in an intended font and metadata, wherein the metadata includes a link to a font source outside of the system of the second user. It is determined whether the intended font is on the system of the second user; and, if the intended font is not on the system of the second user, rendering instructions are obtained from the font source. The rendering instructions include instructions on how to display the text in the intended font on the system of the second user without downloading the intended font to the system of the second user. The text is displayed in the intended font on the system of the second user using the rendering instructions.

Another embodiment of the invention includes a method for sending a message from a first user to a second user, wherein the message includes text in an intended font. Metadata is attached to the message, wherein the metadata includes a link to a font source outside of the system of the second user. The font source provides rendering instructions on how to display the text in the intended font on the system of the second user without downloading the intended font to the system of the second user. The message and the metadata are sent to the system of the second user.

Yet another embodiment of the invention includes a method for providing an intended font to display in a message sent from a first user to a second user, wherein the message includes text in the intended font. Access to a font source by a system of the second user is provided in response to the system of the second user accessing a link to the font source. The link is provided to the system of the second user in metadata attached to the message. Rendering instructions are provided to the system of the second user, wherein the rendering instructions include instructions on how to display the text in the intended font on the system of the second user without downloading the intended font to the system of the second user.

Still another embodiment of the invention includes a system for displaying a message from a first user to a second user. The system includes a communications module for receiving the message from the first user. The message includes text in an intended font and metadata, wherein the metadata includes a link to a font source outside of the system. A processor determines whether the intended font is on the system and obtains rendering instructions from the font source if the intended font is not on the system. The rendering instructions include instructions on how to display the text in the intended font on the system without downloading the intended font to the system. A display is included for displaying the text in the intended font using the rendering instructions.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

Figure 1:
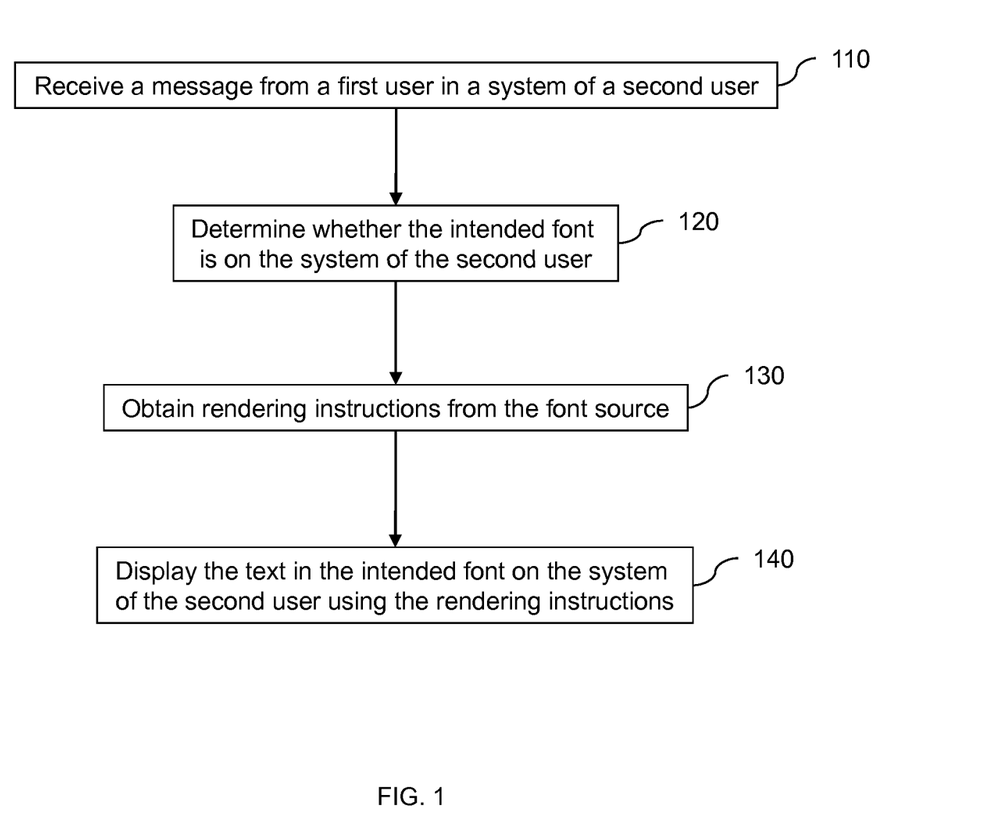
FIG. 1 is a flow diagram illustrating a method for displaying a message from a first user to a second user according to an embodiment of the invention.
Figure 2:
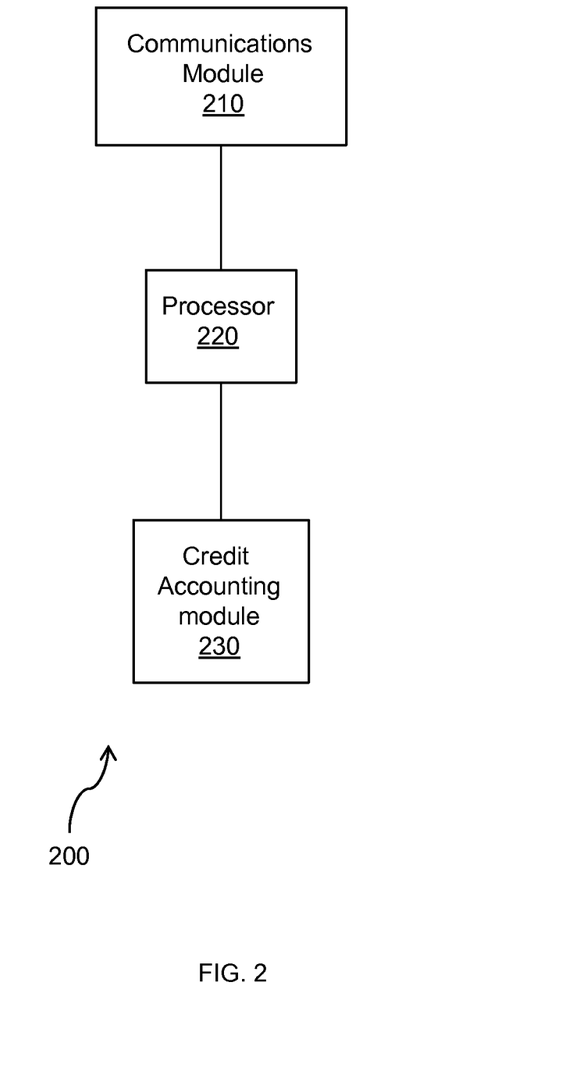
FIG. 2 illustrates a system for displaying a message from a first user to a second user according to an embodiment of the invention.

FIG. 1 is a flow diagram illustrating a method for displaying a message from a first user to a second user according to an embodiment of the invention. As used herein, messages include e-mail messages, instant messages, text messages, and/or collaborative messages (e.g., blogs, threads, forums, wiki comments). The message from the first user is received in a system of the second user (110), wherein the message includes text in an intended font and metadata. FIG. 2 illustrates a system for displaying the message from the first user according to an embodiment of the invention, wherein the system includes a communications module 210 for receiving the message from the first user.

The metadata includes a link to a font source outside of the system of the second user. In at least one embodiment, the link is a hyperlink and the font source is an Internet website. In another embodiment, the font source is an electronic document stored on a network such as, for example, a Portable Document Format (PDF) or word processor document. In a least one embodiment, the message and the metadata lack a style sheet, wherein the system of the second user does not access a style sheet to display the text in the intended font.

In at least one embodiment of the invention, the metadata further includes a security key for accessing the font source, wherein the font source can only be accessed with the security key. In another embodiment, the metadata also includes a username and password for accessing the font source. In yet another embodiment, the username is linked to the user's billing account, wherein the user's billing account specifies a maximum charge to be billed to the user (e.g., $0.05 each time rendering instructions for a font is accessed with a maximum of $50.00 a month for the font). Thus, for example, once the maximum charge is reached, the font source is prompted to provide a different font and/or the system of the first user is prompted to use a different font.

The system further includes a processor 220 for determining whether the intended font is on the system of the second user (120). If the intended font is not on the system of the second user, the processor 220 obtains rendering instructions from the font source (130). The rendering instructions are not included in the message from the first user and have an expiration date that is set by the font source. The rendering instructions include instructions on how to display the text in the intended font on the system of the second user without downloading the intended font to the system of the second user. In at least one embodiment, the rendering instructions are specific to the message from the first user and are incompatible with other messages received by the system of the second user. The text is displayed in the intended font on the system of the second user via a display 230 using the rendering instructions (140).

Figure 3:
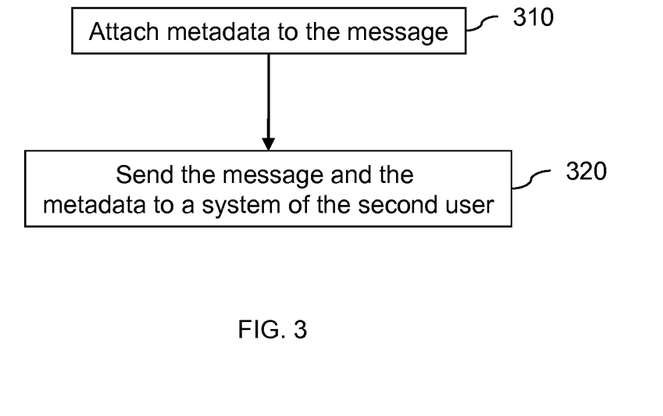
FIG. 3 is a flow diagram illustrating a method for sending a message from a first user to a second user according to an embodiment of the invention.
Figure 4:
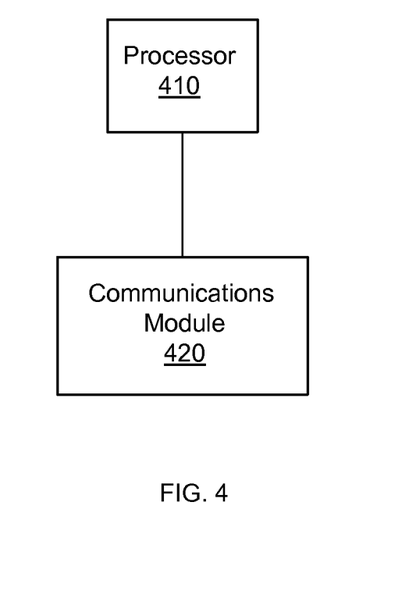
FIG. 4 illustrates a system for sending a message from a first user to a second user according to an embodiment of the invention.

FIG. 3 is a flow diagram illustrating a method for sending a message including text in an intended font from a first user to a second user according to an embodiment of the invention. Metadata is attached to the message via a processor 410 (310), wherein the metadata includes a link to a font source outside of the system of the second user. FIG. 4 illustrates a system for sending the message from the first user to the second user according to an embodiment of the invention.

The font source provides rendering instructions on how to display the text in the intended font on the system of the second user without downloading the intended font to the system of the second user. The message and the metadata are sent to the system of the second user via a communications module 420 (320).

Figure 5:
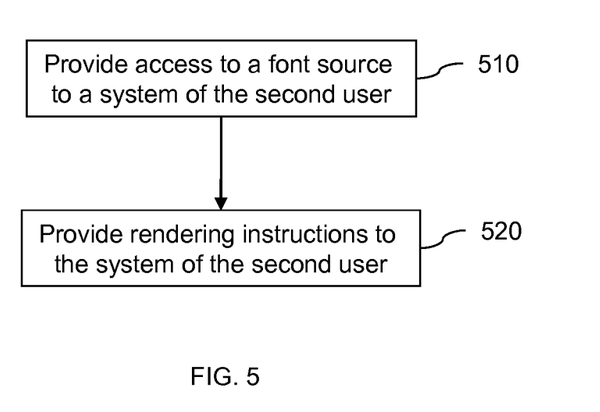
FIG. 5 is a flow diagram illustrating a method for providing an intended font to display in a message sent from a first user to a second user according to an embodiment of the invention.
Figure 6:
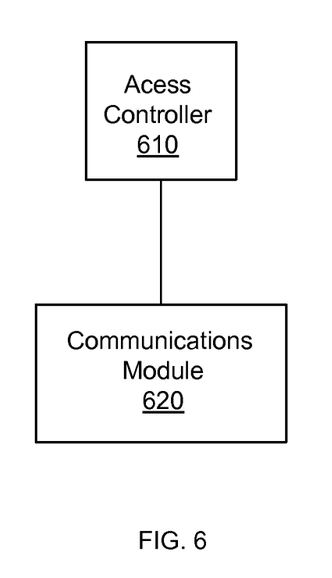
FIG. 6 illustrates a system for providing an intended font to display in a message sent from a first user to a second user according to an embodiment of the invention.

FIG. 5 is a flow diagram illustrating a method for providing an intended font to display in a message sent from a first user to a second user, wherein the message includes text in the intended font. Access to a font source is provided to a system of the second user via an access controller 610 (510). The first user's and/or second user's system includes a personal computer, laptop computer, personal computing device (PDA), tablet, cellular telephone, and/or other wireless/mobile device. FIG. 6 illustrates a system for providing the intended font to display in the message sent from the first user to the second user according to an embodiment of the invention. Access to the font source is provided in response to the system of the second user accessing a link to the font source. The link is provided to the system of the second user in metadata attached to the message. For example, in one embodiment, the first user sends a message from his laptop computer and the second user receives the message from her cellular telephone. The cellular telephone follows a link in the message metadata to access the font source. In at least one embodiment, the metadata includes an identifier for the link. In another embodiment, there is a position for the system to look for the link in the metadata.

The rendering instructions are provided to the system of the second user via a communications module 620 (520). The rendering instructions include instructions on how to display the text in the intended font on the system of the second user without downloading the intended font to the system of the second user. Thus, in the example above, the font source provides instructions to the cellular telephone so that the cellular telephone is able to display the message in the font intended by the first user; however, the font is not downloaded onto the cellular telephone.

Figure 7:
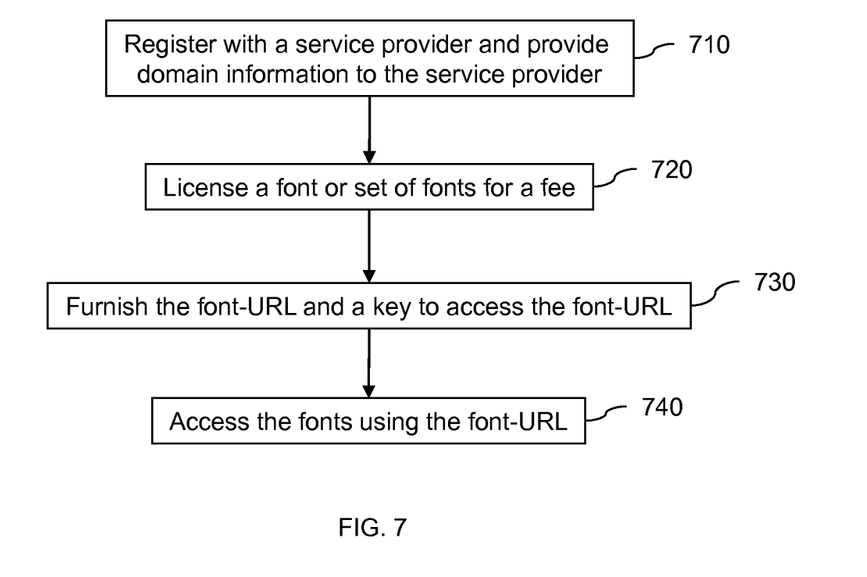
FIG. 7 is a flow diagram illustrating a method for providing fonts as a service according to an embodiment of the invention.

FIG. 7 is a flow diagram illustrating a method for providing fonts as a service according to an embodiment of the invention. A purchaser registers with a service provider and provides its domain information to the service provider 710. The service provider agrees to license a font or set of fonts to the purchaser for a fee 720. In one embodiment, the service provider (e.g., a font designer) requires the purchaser using their font (e.g., a web developer) to pay a fee per page loaded by an end-user. For example, the web developer pays the font designer $0.05 every time an end-user requests a font to load from the font-URL of the service provider (e.g., www.thefontservice.com/thisfont). In another embodiment, after a limit of $5 a month has been reached, the end-user's system default font is used rather than accessing the designer font from the font-URL. In yet another embodiment, the service provider charges the purchaser a flat rate fee for use of their font.

The service provider furnishes the font-URL and a key to access the font-URL to the purchaser 730. The font-URL and key can only be utilized from within the purchaser's registered domain. For example, the font-URL "http://www.provider.com/fonts?license=242098 2u42uoi2323" can only to be utilized from "www.companyabc.com". As described more fully above, the purchaser uses the font-URL to access the fonts 740. The purchaser does not download the fonts; rather, the purchaser's browser is given instructions on how to render the fonts only within the context of the browser (viewing pages at WWW.COMPANYABC.COM). Thus, the service provider retains control over the fonts preventing misuse of the fonts or further distribution of the fonts by the purchaser.

Figure 8:
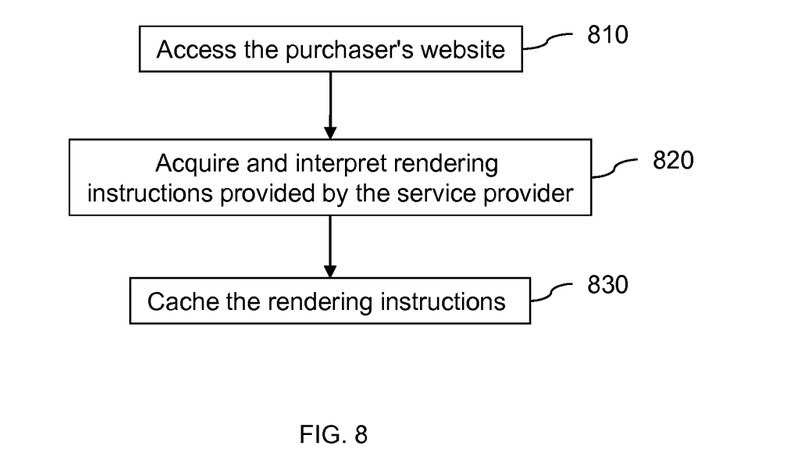
FIG. 8 is a flow diagram illustrating a method for viewing a website by an end-user according to an embodiment of the invention.

FIG. 8 is a flow diagram illustrating a method for viewing a website by an end-user according to an embodiment of the invention. The end-user accesses the purchaser's website, which requires a font licensed by the purchaser from the service provider 810. The end-user's browser, via a plug-in or native functionality, acquires and interprets rendering instructions that are provided by the service provider 820. The rendering instructions include instructions for drawing the font (e.g., using scalable vector graphics (SVG)) and an expiration date. In at least one embodiment, the browser caches the rendering instructions for future use 830. However, the rendering instructions only work on the domains that the key permits. Moreover, the service provider encodes when the rendering instructions will stop working, i.e., expire. Thus, the interests of the service provider are protected while allowing the purchaser and the end-user to view the purchaser's website as it was meant to be viewed. In another embodiment of the invention, the font service is provided to users of e-mail, instant messaging, and other collaborative avenues in addition to websites.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
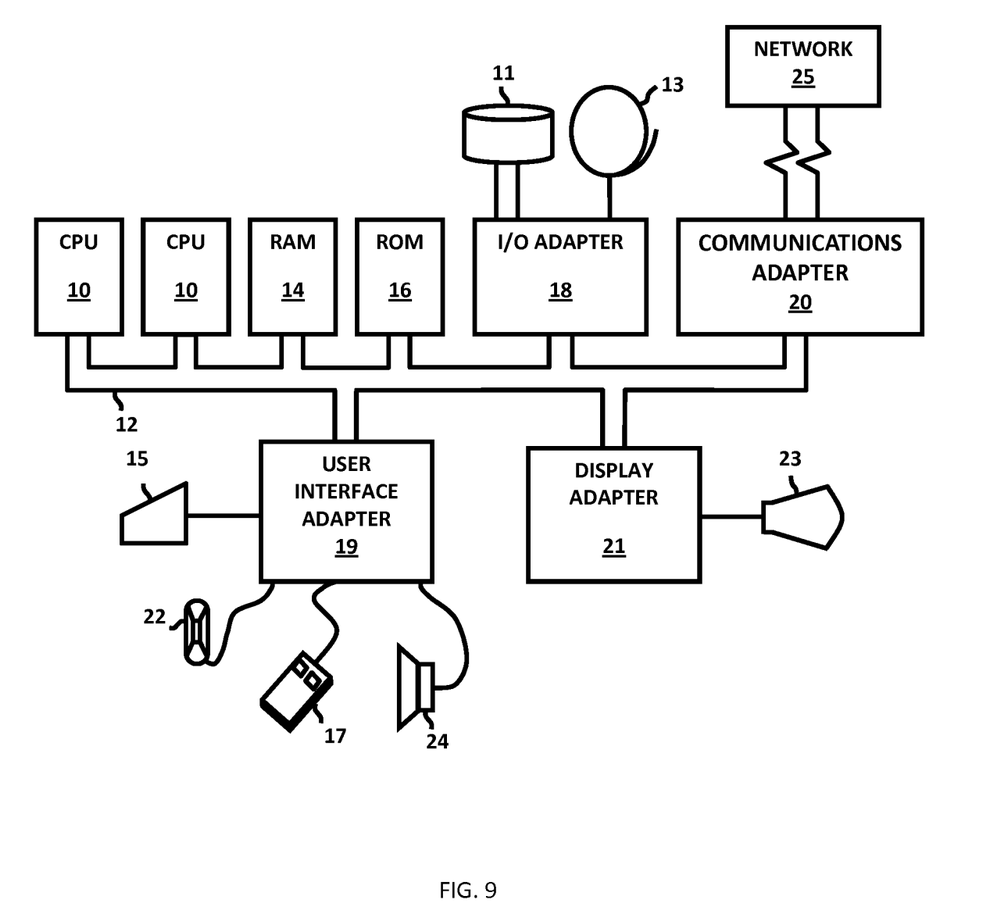
FIG. 9 illustrates a computer program product according to an embodiment of the invention.

Referring now to FIG. 9, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for displaying a message from a first user to a second user, said method including:
    receiving the message from the first user in a system of the second user, the message including text in an intended font and metadata, the metadata including a link to a font source outside of the system of the second user;
    determining whether the intended font is on the system of the second user;
    obtaining rendering instructions from the font source if the intended font is not on the system of the second user, the rendering instructions including instructions how to display the text in the intended font on the system of the second user without downloading the intended font to the system of the second user; and
    displaying the text in the intended font on the system of the second user using the rendering instructions,
    wherein the rendering instructions are specific to the message and are incompatible with other messages received by the system of the second user, and
    wherein the message and the metadata do not include a style sheet.

2. The method according to claim 1, wherein the rendering instructions are not included in the message.

3. The method according to claim 1, wherein the rendering instructions have an expiration date that is set by the font source.

4. The method according to claim 1, wherein the link is a hyperlink, and wherein the font source is an Internet website.

5. The method according to claim 1, wherein the metadata further includes a security key for accessing the font source, and wherein the font source can only be accessed with the security key.

6. The method according to claim 1, wherein the system of the second user does not access a style sheet to display the text in the intended font.

7. A method for providing an intended font to display in a message sent from a first user to a second user, the message including text in the intended font, said method including:
    providing access to a font source by a system of the second user in response to the system of the second user accessing a link to the font source, the link being provided to the system of the second user in metadata attached to the message, wherein the system of the second user does not access a style sheet to display the text in the intended font; and
    providing rendering instructions to the system of the second user, the rendering instructions including instructions on how to display the text in the intended font on the system of the second user without downloading the intended font to the system of the second user, wherein the rendering instructions are specific to the message and are incompatible with other messages received by the system of the second user, the rendering instructions having an expiration date that is set by the font source.

8. A system for displaying a message from a first user to a second user, said system including:
    a communications module for receiving the message from the first user, the message including text in an intended font and metadata, the metadata including a link to a font source outside of said system, wherein the message and the metadata do not include a style sheet;
    a processor for determining whether the intended font is on said system and obtaining rendering instructions from the font source if the intended font is not on said system, the rendering instructions including instructions how to display the text in the intended font on said system without downloading the intended font to said system; and
    a display for displaying the text in the intended font using the rendering instructions, wherein a system of the second user does not access a style sheet to display the text in the intended font.

9. A computer program product for displaying a message from a first user to a second user, said computer program product including:
    a non-transitory computer readable storage medium;
    first program instructions to receive the message from the first user in a system of the second user, the message including text in an intended font and metadata, the metadata including a link to a font source outside of the system, the second user, wherein the message and the metadata do not include a style sheet;
    second program instructions to determine whether the intended font is c the system of the second user;
    third program instructions to obtain rendering instructions from the font source if the intended font is not on the system of the second user, the rendering instructions including instructions how to display the text in the intended font or the system of the second user without downloading the intended font to the system of the second user; and
    fourth program instructions to display the text in the intended font on the system of the second user using the rendering instructions, wherein the system of the second user does not access a style sheet to display the text in the intended font,
    said first program instructions, said second program instructions, said third program instructions, and said fourth program instructions are stored on said computer readable storage medium.

10. The computer program product according to claim 9, further including:
    fifth program instructions to attach the metadata to the message; and
    sixth program instructions to send the message and the metadata to the system of the second user.

* * * * *